United States Patent [19]

Sobey

[11] 4,077,740
[45] Mar. 7, 1978

[54] HELICOPTER ROTOR BLADES

[75] Inventor: Arnold John Sobey, Hindhead, England

[73] Assignee: The Secretary of State for Defence in Her Britannic Majesty's Government of the United Kingdom of Great Britain and Northern Ireland, London, England

[21] Appl. No.: 711,371

[22] Filed: Aug. 3, 1976

[30] Foreign Application Priority Data

Aug. 6, 1975  United Kingdom ............... 32943/75

[51] Int. Cl.² .............................................. B64C 27/46
[52] U.S. Cl. ........................... 416/230; 416/226; 416/240; 416/241 A
[58] Field of Search .............. 416/230, 229, 226, 132, 416/88, 240, 241 A, 141

[56] References Cited

U.S. PATENT DOCUMENTS

| 2,484,141 | 10/1949 | Alex | 416/230 |
| 3,021,246 | 2/1962 | Hutter et al. | 416/230 X |
| 3,065,799 | 11/1962 | McCarty | 416/88 X |
| 3,117,630 | 1/1964 | Barish | 416/88 |
| 3,237,697 | 3/1966 | Ford et al. | 416/230 X |
| 3,321,019 | 5/1967 | Dmitroff et al. | 416/230 X |
| 3,476,484 | 11/1969 | Brunsch | 416/230 |
| 3,669,566 | 6/1972 | Bourquardez et al. | 416/141 X |
| 3,713,753 | 1/1973 | Brunsch | 416/230 X |
| 3,999,886 | 12/1976 | Ormiston et al. | 416/141 X |

Primary Examiner—Everette A. Powell, Jr.
Attorney, Agent, or Firm—Cushman, Darby & Cushman

[57] ABSTRACT

A helicopter rotor blade is constructed at least in part of composite material of the type in which fibres (such as glass or carbon fibres) are embedded in a matrix. The stiffness in the flapping plane, the lagging plane, or both are modified at one or more positions along the blade to provide advantageous resonance frequencies. Modification of the stiffness is achieved by diverting a substantial number of fibres inwardly towards the relevant spanwise neutral bending plane.

3 Claims, 6 Drawing Figures

HELICOPTER ROTOR BLADES

The present invention relates to helicopter rotor blades. In general the development of helicopter rotor blades during the history of helicopters has been very conservative. Rotor blades of many different helicopters have been of almost identical shape and constructed of similar materials, and the aerofoil shapes have been selected from a very few standard configurations. However, recently, with the increasing requirements for faster helicopters for military use and more comfortable helicopters for commercial use there has arisen considerable activity in the investigation of different profiles, varied plan forms, and different materials. Amongst materials which have aroused interest are the materials known as composites, which consist of a plurality of fibres embedded in a matrix material. The structural ridigidity of a rotor constructed from a composite is provided by the fibres which extend spanwise of the blade. The matrix material acts mainly as a binding agent. Use of composite materials simplifies the production problems inherent in the production of complex profiles and plan forms.

One of the helicopters main disadvantages is the high level of vibration present throughout the structure, a major contribution to this vibration being the rotor blades with their high aspect ratios. A rotor blade is prone to flap in three modes, namely in the flapping plane, normal to the direction of motion of the blade, in the lagging plane along the line of motion of the blade, and pitching about the axis of the blade. Of these modes flapping and lagging are the most significant.

It is well known in the art that in order to provide forward thrust rotor blades must flap at a frequency of one cycle for each revolution of the blades. For this reason blades are designed to have a flapping first resonance frequency slightly greater than the design rotation frequency of the blades. The high level of aerodynamic damping in this mode prevents flapping amplitudes at blade rotation frequency from being too high.

Once the aerodynamic characteristics of a rotor blade, and hence the blade shape, and the flapping first resonance frequency have been specified, in the present state of the art the alternatives available to control other blade characteristics are limited. However it is essential that the higher resonant flapping frequencies should not be close to harmonics of the blade rotational frequency. It is also essential that the lagging resonant frequencies should not be close to the blade rotational frequency. In most rotor designs mass distribution, mechanical dampers, or both have to be used to obtain acceptable higher flapping resonant frequencies and lagging resonant frequencies.

A further problem is that there is little or no aerodynamic damping for vibrations in the lagging plane. In some blade designs the attachment of the blade to the rotor hub provides little or no structural damping, so mechanical dampers have to be incorporated in the blade to hub junction to damp lagging vibrations.

Conventional helicopter rotor blade constructions therefore utilise mass distribution and mechanical damping which are undesirable from the viewpoints of both weight and complexity. Despite these, however, it has to be accepted that some resonance will occur during acceleration and deceleration of the blades on starting up and stopping an engine driving the blades.

It is believed that rotors can now be constructed of composite materials in such a fashion that some of the above mentioned problems can be reduced or eliminated.

According to the present invention, in a helicopter rotor blade formed at least in part of composite structure having fibres embedded in a matrix, the fibres extending substantially spanwise of the blade, a substantial number of the fibres are diverted inwardly towards a spanwise neutral bending plane at a section of the blade at at least one spanwise position of the blade.

The bending plane can be the flapping plane, or the lagging plane.

The section may be a chord of the blade, lie at an angle to a chord of the blade, or may be a surface of revolution.

Some or all of the fibres are diverted inwardly, and may lie on or adjacent to the neutral plane.

The invention, and the advantages accruing therefrom, may better be understood by reference to the following description of an embodiment of the invention, which is given by way of example only, with reference to the accompanying drawings of which:

Figure 3:
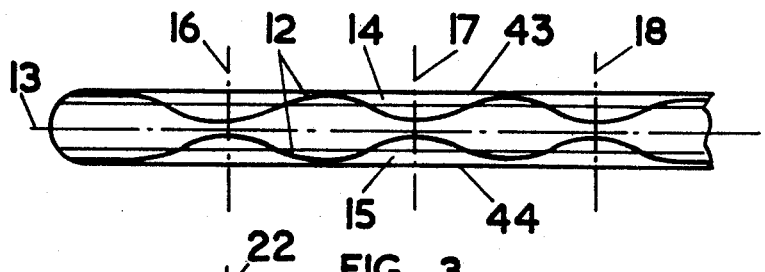
FIG. 3 is a section along line 33 of FIG. 2.
Figure 4:
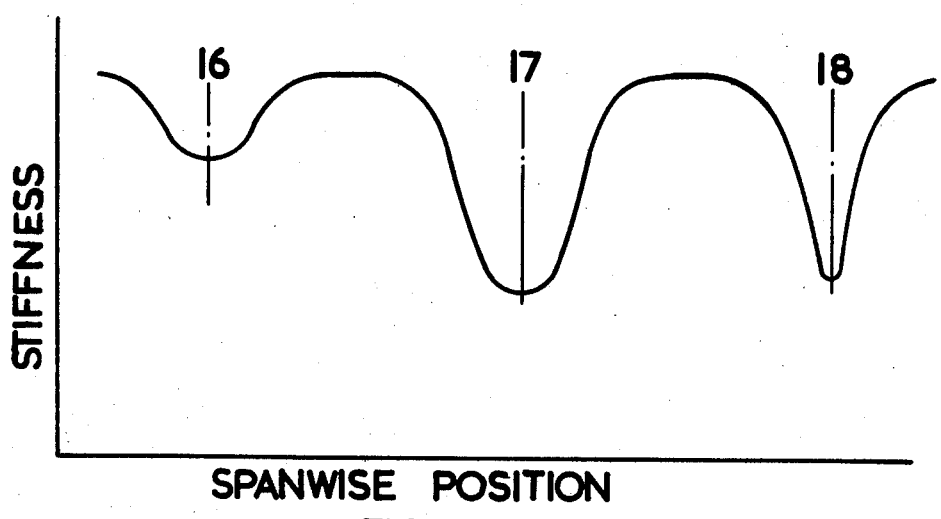
FIG. 4 is a graph of the stiffness of the blade along the span.

A helicopter rotor blade 10 (FIG. 1) having a root 41 connected to a hub 11 and extending to a tip 42, and having (FIG. 3) an upper surface 43 and a lower surface 44 is formed from a matrix material having a plurality of fibres, such as those indicated at 12 running spanwise along the blade. The major contribution to the rigidity of the blade 10 comes from the fibres 12 lying farthest from the spanwise neutral flapping plane 13 (FIG. 2), that is by the fibres situated in the structure indicated at 14 and 15 in FIG. 2. In accordance with the present invention and as illustrated in FIG. 3 at sections of the blade at spanwise positions as illustrated at 16, 17 and 18 on FIGS. 1 and 3, fibres 12 are diverted inwardly from the matrix material of structure 14, 15 to lie on or adjacent to the spanwise neutral flapping plane 13. In particular in a first portion 45 fibers towards the outboard end of the portion are diverted inwardly from the upper 43 and lower 44 surfaces until at position 18 (FIG. 7) the fibers 12 lie in a position 50 adjacent the neutral flapping plane 13. In a second portion 46 the fibers 12 are diverted outwardly from adjacent the spanwise neutral flapping plane 13 to lie adjacent the upper 43 and lower 44 surfaces. The effect of this, as illustrated in FIG. 4, is to reduce the stiffness of the blade 10 at the sections 16, 17 and 18 without reducing the strength of the blade.

The degree of reduction can be varied by varying the number of fibres 12 which are diverted inwardly, or by varying the amount fibres 12 are diverted inwardly.

Figure 1:
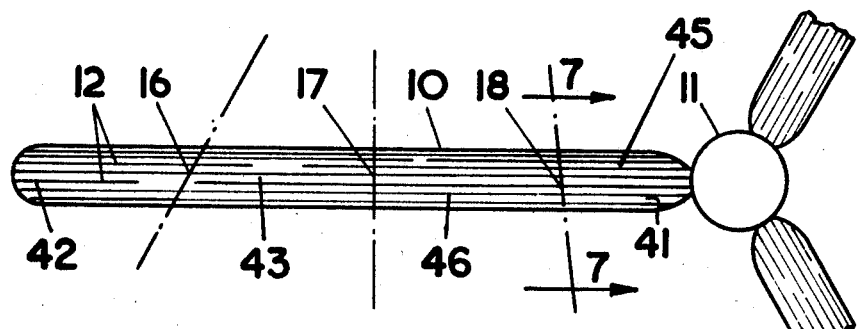
FIG. 1 is a plan view of a helicopter rotor blade and hub.
Figure 2:
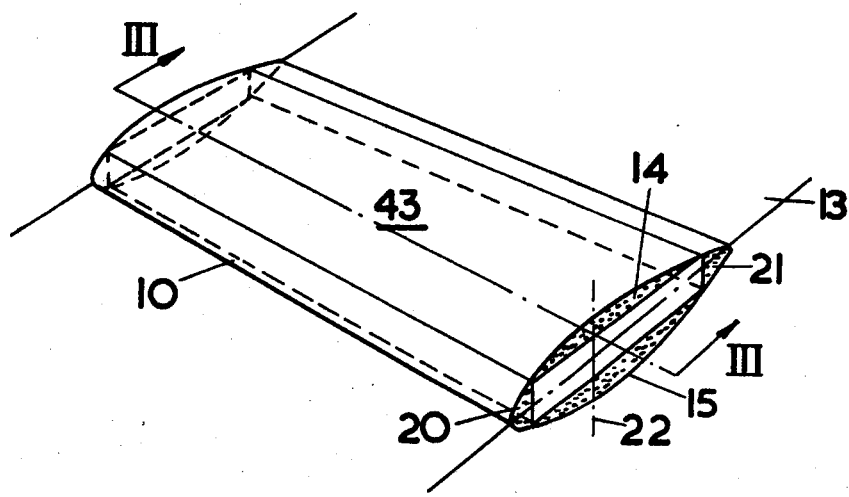
FIG. 2 is a perspective view partly in section of a helicopter rotor blade.
Figure 7:
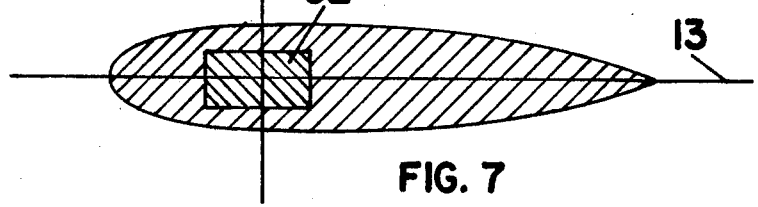

Analogous effects can obviously be obtained in the lagging plane by diverting fibres 12 from the leading and trailing edges (20, 21 respectively in FIG. 2) of the blade 10 towards the lagging spanwise neutral plane, which extends through the line 22 as shown in FIG. 2. This is also illustrated in FIG. 7 where the fibers pass through area 50 of blade 10. Diverting fibers away from the leading and trailing edges and upper and lower surfaces of the blade 10 and concentrating them around the juncture of the neutral planes 13, 22 as illustrated in FIG. 7 reduces the stiffness of the blade 10 in both the flapping and the lagging planes. FIG. 7 is a section along line 77 of FIG. 1.

It will be appreciated by those skilled in the art how this type of construction can be used to ensure that the blade 10 has acceptable resonant frequencies. Other potential uses of the invention are outlined below.

Figure 5:
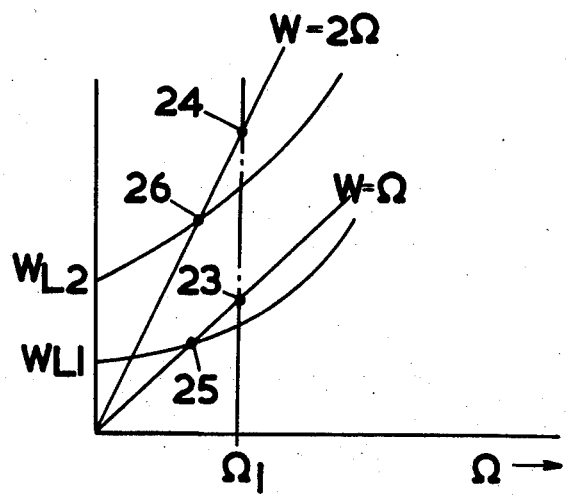
FIGS. 5 and 6 are graphs of blade resonant frequencies plotted against the blade rotational speed.

The resonant frequencies of a rotor blade 10 depend on the elastic stiffness of the blade and of the centrifugal forces acting on the blade. This is illustrated in FIG. 5 where the first and second lagging resonant frequencies WL1 and WL2 are plotted against rotor 10 rotational speed $\Omega$. The resonant frequencies WL1 and WL2 must not be near the rotor rotational frequency or harmonics of the rotor rotational frequency at the design rotor speed $\Omega_1$, as illustrated at 23, 24 in FIG. 5.

Figure 6:
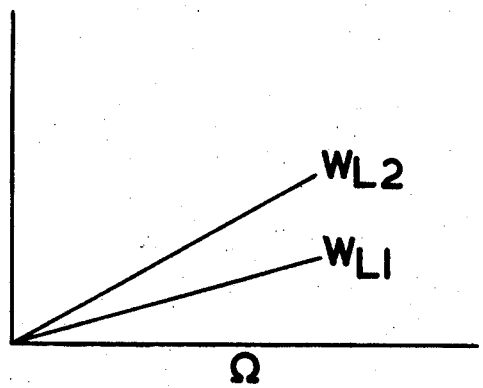

However, as the rotor 10 accelerates from or decelerates to rest it must pass through resonant frequencies, as illustrated at 25, 26 in FIG. 5. By diverting fibres 12 inwardly to on or adjacent the lagging spanwise neutral plane 22, to make the elastic stiffness of the blade zero, the resonant frequencies can be made dependent only on the centrifugal force acting on the blade 10, as illustrated in FIG. 6. In this way the rotor rotational frequency and its harmonics can be separated from the resonant frequencies, and resonance during rotor acceleration and deceleration can be avoided.

By angling the section, along which fibres 12 are angled inwardly, to the chord of the blade 10, as illustrated at 18 or at 16 in FIG. 1 a component of lagging vibration can be obtained from a flapping vibration mode. Similarly a component of flapping vibration can be obtained from a lagging vibration mode. As flapping vibration is aerodynamically damped this offers a means of aerodynamically damping lagging vibrations so eliminating or reducing the mechanical damping required.

It will be realised that the invention is applicable to the use of any type of fibre, for example carbon fibre or glass fibre.

It will be appreciated that not all the blade need be formed of composite structure, as long as a substantial spanwise portion is of such structure. Roots and tips, for example, may be of metallic construction. Also blade leading edges may be formed of metal, which may or may not contribute to the blade stiffness, to reduce wear due to contact with foreign bodies such as sand or dust.

What I claim is:

1. A helicopter rotor blade having a root and extending outward to a tip, an upper surface, a lower surface, a leading edge, a trailing edge, a spanwise neutral flapping plane and a spanwise neutral lagging plane, comprised at least in part of composite material having fibers embedded in a matrix, the fibers extending substantially spanwise of the blade, the blade having:

a first portion extending spanwise adjacent the root wherein fibers lie adjacent said upper and lower surfaces, said fibers at the outward end of said portion being diverted inwardly from said upper and lower surfaces to a position wherein said fibers lie adjacent said spanwise neutral flapping plane; and a second portion extending spanwise from said position wherein said fibers are diverted outwardly from adjacent said spanwise neutral flapping plane to lie adjacent said upper and lower surfaces.

2. A helicopter rotor blade having a root and extending outward to a tip, an upper surface, a lower surface, a leading edge, a trailing edge, a spanwise neutral flapping plane and a spanwise neutral lagging plane, comprised at least in part of composite material having fibers embedded in a matrix, the fibers extending substantially spanwise of the blade, the blade having:

a first portion extending spanwise from adjacent the root wherein fibers lie adjacent said leading and trailing edges, said fibers at the outward end of said portion being diverted inwardly from said leading and trailing edges to a position wherein said fibers lie adjacent said spanwise neutral lagging plane; and a second portion extending spanwise from said position wherein said fibers are diverted outwardly from adjacent said spanwise neutral lagging plane to lie adjacent said leading and trailing edges.

3. A helicopter rotor blade having a root and extending outward to a tip, an upper surface, a lower surface, a leading edge, a trailing edge, a spanwise neutral flapping plane and a spanwise neutral lagging plane, comprised at least in part of composite material having fibers embedded in a matrix, the fibers extending substantially spanwise of the blade, the blade having:

a first portion extending spanwise from adjacent the root wherein fibers lie adjacent said upper and lower surfaces, and adjacent said leading and trailing edges, said fibers at the outward end of said portion being directed inwardly from said upper and lower surfaces and said leading and trailing edges to a position wherein said fibers lie adjacent a juncture of said spanwise neutral flapping and lagging planes; and a second portion extending spanwise from said position wherein said fibers are diverted outwardly from adjacent said junction of said spanwise neutral flapping and lagging planes to lie adjacent said upper and lower surfaces and said leading and trailing edges.

* * * * *